United States Patent
Motojima et al.

(10) Patent No.: US 6,796,764 B2
(45) Date of Patent: Sep. 28, 2004

(54) TURBINE FUEL PUMP

(75) Inventors: Junichi Motojima, Gunma (JP); Masaaki Iijima, Gunma (JP)

(73) Assignee: Hitachi Unisia Automotive, Ltd., Kanagawa (JP)

(*) Notice: Subject to any disclaimer, the term of this patent is extended or adjusted under 35 U.S.C. 154(b) by 0 days.

(21) Appl. No.: 10/423,886

(22) Filed: Apr. 28, 2003

(65) Prior Publication Data

US 2003/0228212 A1 Dec. 11, 2003

(30) Foreign Application Priority Data

Jun. 7, 2002 (JP) ........................................ 2002-167506

(51) Int. Cl.[7] ................................................. F01D 1/12
(52) U.S. Cl. ....................... 415/55.1; 415/200; 415/213; 416/241 A; 417/423.1
(58) Field of Search ............................... 415/55.1–55.7, 415/200, 213; 416/241 A; 417/423.1

(56) References Cited

U.S. PATENT DOCUMENTS

| | | | |
|---|---|---|---|
| 4,493,620 A | * | 1/1985 | Takei et al. ................. 417/366 |
| 4,938,659 A | | 7/1990 | Bassler et al. |
| 5,409,357 A | * | 4/1995 | Yu et al. ................... 417/423.1 |
| 6,174,128 B1 | * | 1/2001 | Yu .............................. 415/55.2 |
| 6,443,692 B1 | * | 9/2002 | Sakamoto et al. ........ 415/55.1 |

FOREIGN PATENT DOCUMENTS

| | | |
|---|---|---|
| JP | 59-141795 A | 8/1984 |
| JP | 60-47894 A | 3/1985 |

* cited by examiner

Primary Examiner—Edward K. Look
(74) Attorney, Agent, or Firm—Sughrue Mion, PLLC

(57) ABSTRACT

A turbine fuel pump includes: a casing for casing an electric motor; a pump housing disposed at the casing, and an impeller rotatably disposed in the pump housing. The pump housing includes a fuel passage between an intake port and a delivery port. The fuel passage includes a flow path defining a cross section S. The impeller has an outer periphery formed with a vane which force feeds the fuel in the fuel passage when the impeller is rotated with the electric motor. The vane defines a height H and a thickness T. The fuel passage defines the following typical dimension Rm:

$Rm=S/(2H+T)$.

A wall of the flow path defining the cross section S is profiled by a profile length Lp. The profile length Lp divided by the typical dimension Rm makes a dimension ratio Lp/Rm in a first range from 11 to 16.

17 Claims, 7 Drawing Sheets

TURBINE FUEL PUMP

BACKGROUND OF THE INVENTION

1. Field of the Invention

The present invention relates to a turbine fuel pump preferably used, for example, for supplying fuel to an injection valve and the like of an engine installed on a vehicle.

2. Description of the Related Art

In general, for supplying fuel to an engine, an electronically controlled fuel injection device is installed on a vehicle (passenger car) and the like. The fuel injection device is constituted of an injection valve, a fuel pump and the like. The injection valve is for injecting fuel to a combustion chamber of the engine, while a fuel pump is for discharging the fuel (in a fuel tank installed on a rear side of the vehicle) to the injection valve.

Japanese Patent Unexamined Publication No. showa 60 (1985)-47894 (=JP60047894) equivalent of U.S. Pat. No. 4,938,659 discloses a turbine fuel pump (entitled "FUEL PUMP" in U.S. Pat. No. 4,938,659). The turbine fuel pump in U.S. Pat. No. 4,938,659 includes a casing, an upper cover, a pump housing, and an impeller. The casing is shaped substantially into a barrel and cases therein an electric motor. The upper cover is disposed on a first side of the casing. The pump housing is disposed at a second end of the casing in such manner as to support the electric motor between the upper cover and the pump housing. Moreover, the pump housing has an annular fuel passage between an intake port and a delivery port for respectively taking in and delivering the fuel. The impeller is housed in the pump housing and is rotated by the electric motor.

BRIEF SUMMARY OF THE INVENTION

It is an object of the present invention to provide a turbine fuel pump.

It is another object of the present invention to improve pump efficiency of the turbine fuel pump by designing profile of a flow path in view of profile length and the like of the flow path.

According to a first aspect of the present invention, there is provided a turbine fuel pump, comprising:

i) a casing for casing therein an electric motor;

ii) a pump housing disposed at the casing, the pump housing being formed with an intake port and a delivery port for respectively taking in and delivering fuel, the pump housing including a fuel passage between the intake port and the delivery port, the fuel passage including a flow path defining a cross section S; and iii) an impeller rotatably disposed in the pump housing, the impeller having an outer periphery formed with a vane which force feeds the fuel in the fuel passage of the pump housing when the impeller is rotated with the electric motor, the impeller being surrounded by the flow path, the vane of the impeller defining a height H and a thickness T.

The fuel passage defines the following typical dimension Rm, with respect to the cross section S of the flow path relative to the height 14 of the vane and the thickness T of the vane:

$$Rm = S/(2H+T).$$

A wall of the flow path defining the cross section S is profiled by a profile length Lp, the profile length Lp divided by the typical dimension Rm making a dimension ratio Lp/Rm in a first range from 11 to 16.

According to a second aspect of the present invention, there is provided a pump housing, comprising:

i) a fuel passage formed between an intake port and a delivery port for respectively taking in and delivering fuel, the fuel passage including a flow path defining a cross section S; and ii) an impeller rotatably disposed in the pump housing, the impeller having an outer periphery formed with a vane which force feeds the fuel in the fuel passage of the pump housing when the impeller is rotated with an electric motor, the impeller being surrounded by the flow path, the vane of the impeller defining a height H and a thickness T.

The fuel passage defines the following typical dimension Rm, with respect to the cross section S of the flow path relative to the height H of the vane and the thickness T of the vane:

$$Rm = S/(2H+T).$$

A wall of the flow path defining the cross section S is profiled by a profile length Lp, the profile length Lp divided by the typical dimension Rm making a dimension ratio Lp/Rm in a first range from 11 to 16.

The other objects and features of the present invention will become understood from the following description with reference to the accompanying drawings.

DETAILED DESCRIPTION OF THE EMBODIMENT

In the following, various embodiments of the present invention will be described in detail with reference to the accompanying drawings.

For ease of understanding, the following description will contain various directional terms, such as, left, right, upper, lower, forward, rearward and the like. However, such terms are to be understood with respect to only a drawing or drawings on which the corresponding part of element is illustrated.

Described in detail referring to FIG. 1 to FIG. 7 is construction of a turbine fuel pump, according to embodiments of the present invention.

As is seen in FIG. 1 to FIG. 5, there is provided the turbine fuel pump, according to a first embodiment of the present invention.

There is provided a casing 1 which is shaped substantially into a barrel and is an outer shell of a fuel pump. Casing 1 is made of a metal pipe material and the like. Casing 1 has a first end (upper in FIG. 1) blocked by an after-described discharge cover 2 and a second end (lower in FIG. 1) blocked by an after-described pump housing 9.

Figure 1:
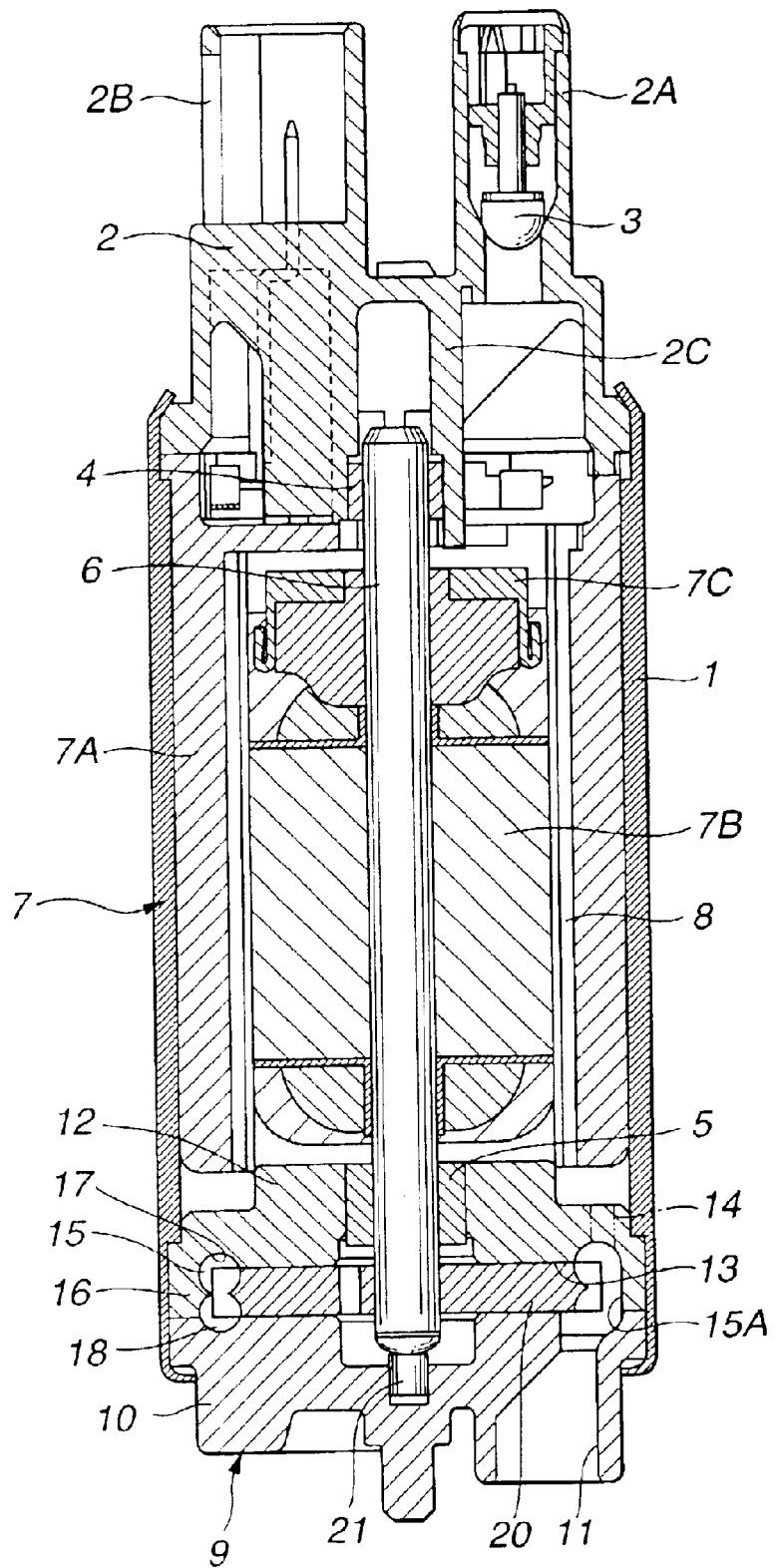
FIG. 1 shows a longitudinal cross section of a turbine fuel pump, according to a first embodiment of the present invention.

There is provided the discharge cover 2 disposed on the first side (upper in FIG. 1) and shaped substantially into a barrel. As is seen in FIG. 1, discharge cover 2 has a discharge port 2A and a connector portion 2B each of which protruding upward. Substantially in the upper-middle part of the turbine fuel pump in FIG. 1, discharge cover 2 has an axial receptacle barrel 2C extending downward.

In discharge cover 2, there is provided a check valve 3 for keeping a remnant fuel pressure. When an after-described electric motor 7 is rotated, check valve 3 is opened by fuel through casing 1, thus discharging the fuel from discharge port 2A to an outer fuel pipe (not shown in FIG. 1). On the contrary, when electric motor 7 is turned off, check valve 3 is closed, thus preventing the fuel in the outer fuel pipe (not shown in FIG. 1) from coming back into casing 1. In sum, the fuel pressure in the outer fuel pipe (not shown in FIG. 1) can be kept at a given value (remnant fuel pressure).

There is provided a first bush 4 which is a bearing engageably disposed in axial receptacle barrel 2C of discharge cover 2. In combination with an after-described second bush 5 on pump housing 9, first bush 4 bears an after-described rotational shaft 6 in such a manner that rotational shaft 6 can rotate.

There is provided second bush 5 for bearing rotational shaft 6 in combination with first bush 4. Rotational shaft 6 is rotatably disposed between first bush 4 and second 5. Second bush 5 is another bearing which is disposed on pump housing 9's side. Second bush 5 is securely mates in an after-described stepped hole 12E (see FIG. 2) of an after-described inner housing 12. Rotational shaft 6 is slidably inserted into an inner periphery of second bush 5.

Figure 2:
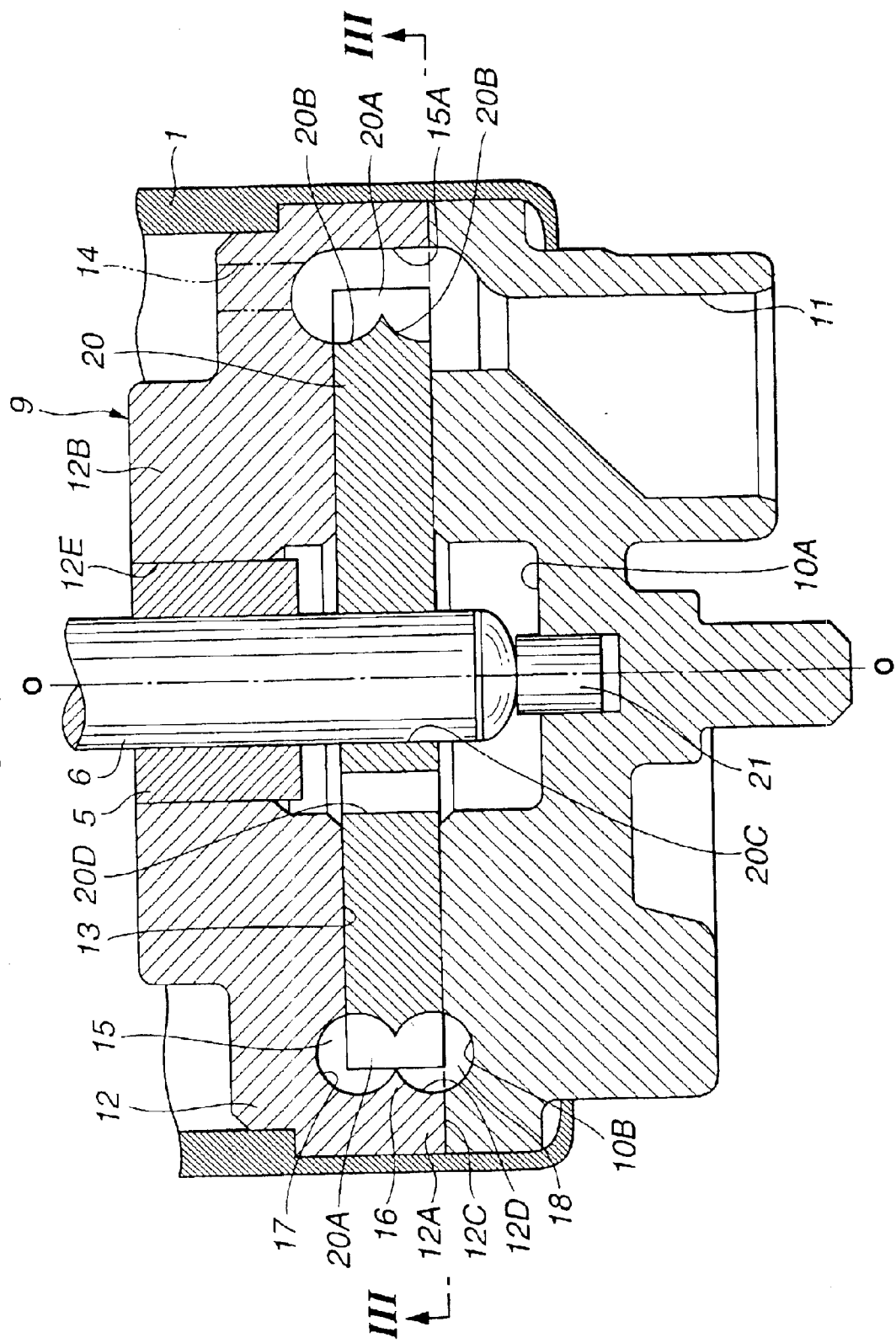
FIG. 2 shows a cross section of an enlarged essential part including a pump housing 9 and the like in FIG. 1.

There is provided rotational shaft 6 born between discharge cover 2 and pump housing 9 via first bush 4 and second bush 5. In casing 1, rotational shaft 6 extends axially along an axial line O—O, as is seen in FIG. 2. In casing 1, an after-described rotor 7B and the like of electric motor 7 is rotatably supported by rotational shaft 6.

Figure 3:
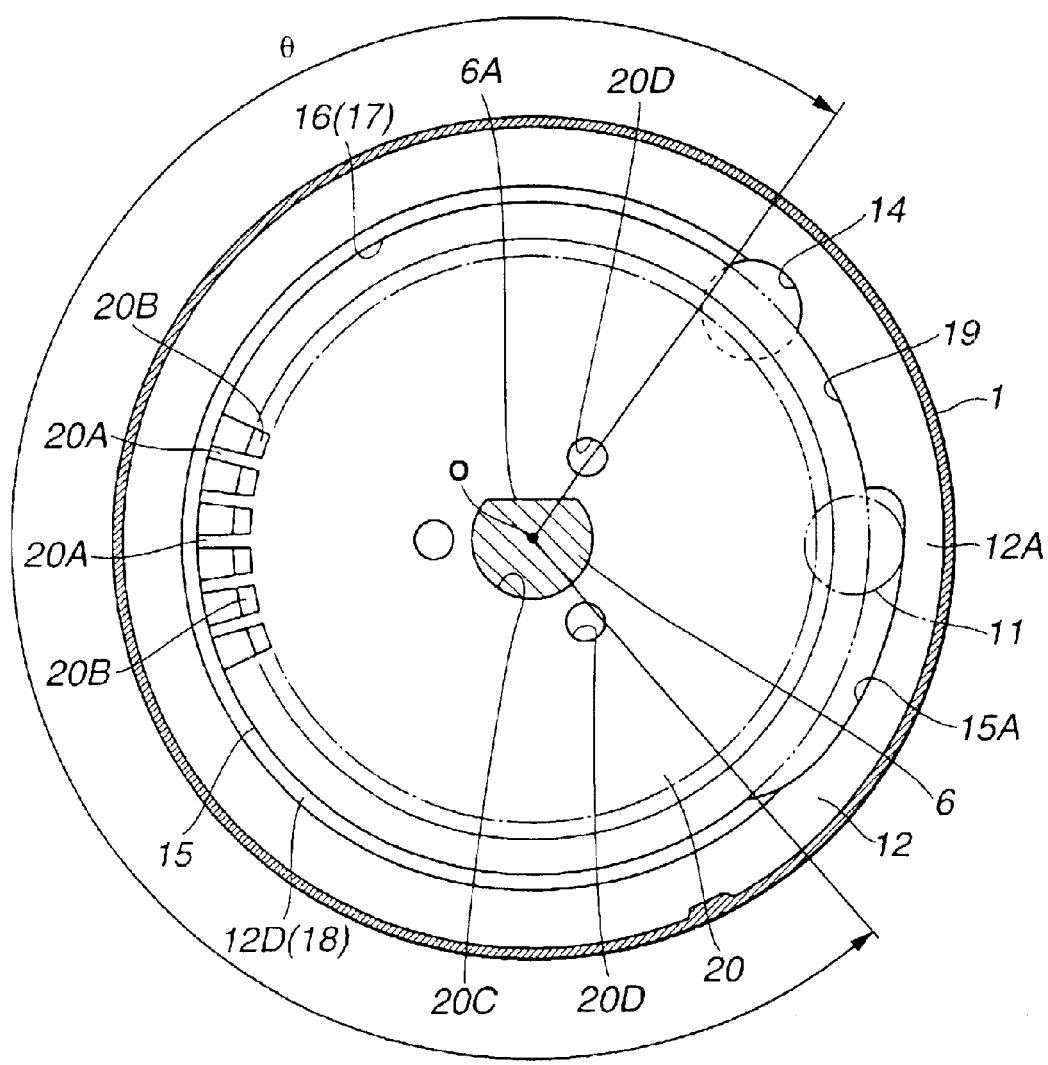
FIG. 3 is a cross section taken along lines III—III in FIG. 2, including an inner housing 12 and an impeller 20.

Hereinabove, a first end (upper in FIG. 1) of rotational shaft 6 is inserted into axial receptacle barrel 2C of discharge cover 2, and is rotatably born by first bush 4 in axial receptacle barrel 2C. On the other hand, a second end (lower in FIG. 1) of rotational shaft 6 protrudes into pump housing 9 via second bush 5. As is seen in FIG. 3, the side defining the second end (lower) of rotational shaft 6 is formed with an after-described chamfer portion 6A which engages with an after-described impeller 20 in a state of stopping rotation of impeller 20.

In casing 1, there is provided electric motor 7. Electric motor 7 includes a yoke 7A, rotor 7B, a commutator 7C, a pair of brushes (not shown) and the like. Disposed between discharge cover 2 and pump housing 9, yoke 7A mates in casing 1. Yoke 7A shaped substantially into a barrel supports a stator (not shown) which is made of a permanent magnet. Rotor 7B is inserted into yoke 7A defining therebetween a gap and the like. Rotor 7B is mounted to rotational shaft 6 in such a manner as to rotate integrally with rotational shaft 6. The pair of the brushes (not shown) slidably abut on commutator 7C.

Energizing connector portion 2B of discharge cover 2 from outside supplies current to rotor 7B via the brushes (not shown) and commutator 7C, so as to rotate rotor 7B integrally with rotational shaft 6, thus rotating impeller 20.

Between yoke 7A and rotor 7B, there is provided a passage portion 8 for the fuel. Via the gap and the like between the yoke 7A and rotor 7B, passage portion 8 can communicate the fuel from delivery port 14 of pump housing 9 to discharge cover 2's side.

There is provided pump housing 9 disposed on the second side (lower in FIG. 1) of casing 1. Pump housing 9 is constituted of an after-described outer housing 10 (lower in FIG. 1) and inner housing 12 (upper in FIG. 1) in such a manner that outer housing 10 physically joins with inner housing 12. Impeller 20 is rotatably housed in pump housing 9.

There is provided outer housing 10 constituting a housing member of pump housing 9. As is seen in FIG. 1 and FIG. 2, outer housing 10 is engaged with a lower end of casing 1 in a method including calking and the like, thus blocking casing 1 from outside. In addition, outer housing 10 is made of a metal material which is aluminum and the like, and formed in a method including aluminum die cast and the like. Moreover, outer housing 10 is formed with an intake port 11 for taking in the fuel.

As is seen in FIG. 2, substantially in the center of outer housing 10, a dent portion 10A is formed which is shaped substantially into a circle. As is seen in FIG. 2, outer housing 10 is formed with an arc groove 10B which extends circumferentially around axial line O—O outside impeller 20 and has a cross section shaped substantially into a semicircle. In combination with an after-described peripheral groove 12D of inner housing 12, arc groove 10B forms an after-described second flow path 18. Moreover, arc groove 10B extends circumferentially in a range covered with a given angle θ, as is seen in FIG. 3.

There is provided inner housing 12 constituting pump housing 9 in combination with outer housing 10. Like outer housing 10, inner housing 12 is formed in the method including the aluminum die cast and the like. Physically joining with outer housing 10, inner housing 12 mates in casing 1.

Figure 4:
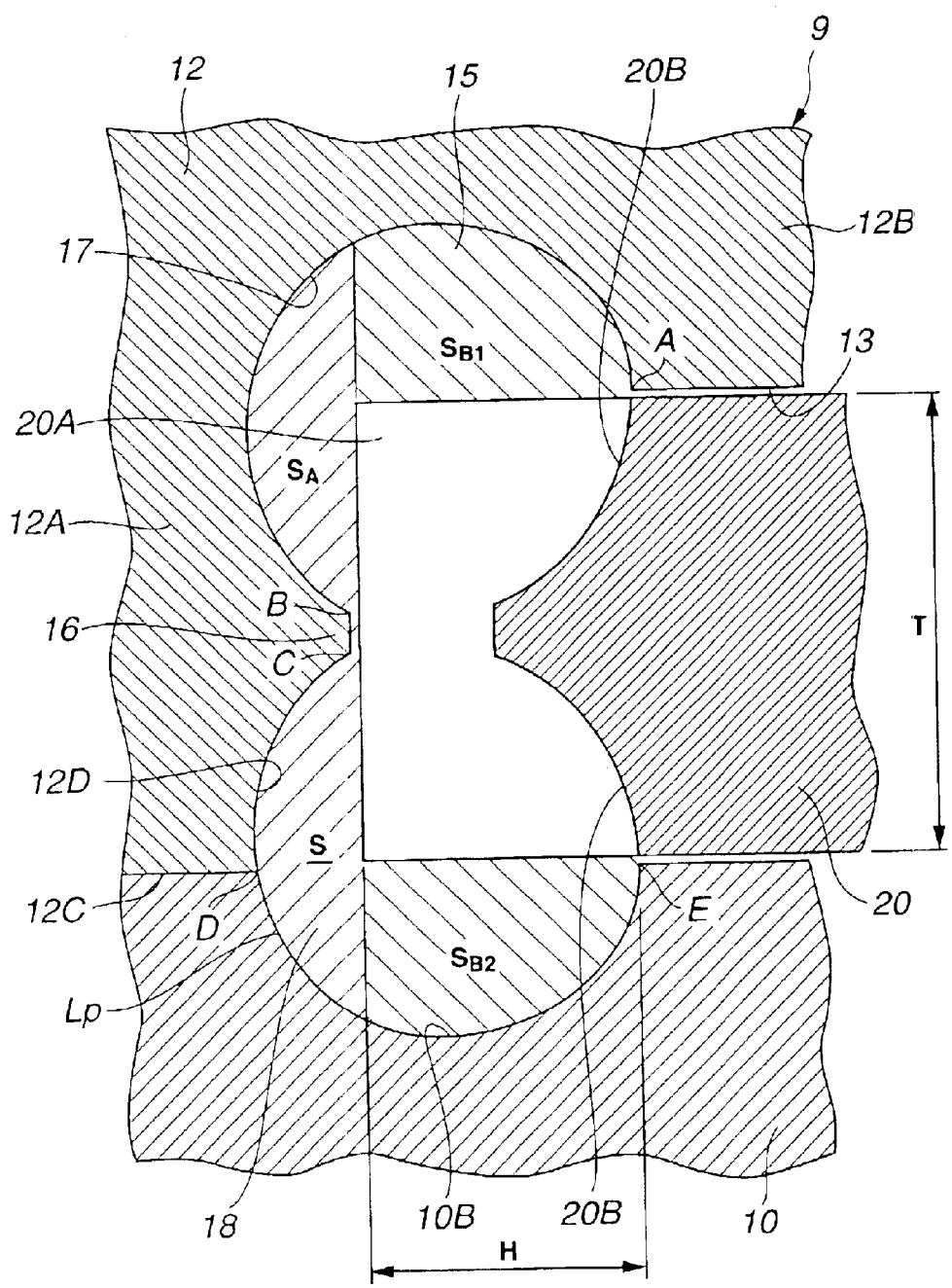
FIG. 4 shows an enlarged essential part including a fuel passage 15, according to the first embodiment.

As is seen in FIG. 2 to FIG. 4, inner housing 12 is formed with a barrel portion 12A and a cover member 12B. With this, inner housing 12 is substantially a flat covering barrel. More specifically, barrel portion 12A is a peripheral wall of inner housing 12, while cover member 12B covers over barrel portion 12A.

On an inner side of barrel portion 12A, there is defined a receptacle dent portion 13 shaped substantially into a circle. Impeller 20 is received in receptacle dent potion 13. There is also defined a joining face 12C for physically joining outer housing 10 with inner housing 12. Receptacle dent portion 13 opens to joining face 12C's side.

Barrel portion 12A of inner housing 12 is formed with peripheral groove 12D shaped substantially into an arc. Peripheral groove 12D is disposed below an after-described annular protrusion 16. In combination with arc groove 10B of outer housing 10, peripheral groove 12D forms second flow path 18 (lower in FIG. 2).

On the other hand, substantially in the center of cover member 12B of inner housing 12, there is formed a stepped hole 12E, as is seen in FIG. 2. Second bush 5 can securely mate in stepped hole 12E. Cover member 12B has an outer periphery formed with a delivery port 14 extending upward and downward, as is depicted by two-chain lines in FIG. 2.

There is provided a fuel passage 15 in pump housing 9. Fuel passage 15 is positioned outside receptacle dent portion 13 and shaped substantially into an annularity. Moreover, fuel passage 15 extends circumferentially in a form of an English alphabet "C" around an axial center O, as is seen in FIG. 3. Annular protrusion 16 splits fuel passage 15 into two, namely, a first flow path 17 (upper in FIG. 2) and second flow path 18 (lower in FIG. 2).

As is seen in FIG. 3, fuel passage 15 has an initial terminal communicating to intake port 11 and an end terminal communicating to delivery port 14. Around the initial terminal of fuel passage 15, there is defined an intake passage portion 15A which is formed by partly cutting out barrel portion 12A and cover member 12B of inner housing 12. The fuel taken in from intake port 11 can be smoothly led into fuel passage 15 through intake passage portion 15A.

There is provided annular protrusion 16 on barrel portion 12A of inner housing 12. Substantially in a form of a mountain, annular protrusion 16 protrudes radially inward toward an outer periphery of impeller 20, as is seen in FIG. 2, thus axially splitting fuel passage 15 into two, namely, first flow path 17 (upper in FIG. 2) and second flow path 18 (lower in FIG. 2).

Hereinabove, first flow path 17 is formed in the following method:

Machine (mill) an inner corner between barrel portion 12A and cover member 12B of inner housing 12, in such a manner as to form a concave groove which has a cross section shaped substantially into an arc, or into an English alphabet "U" inclined by a predetermined angle relative to axial line O—O.

On the other hand, second flow path 18 is formed with arc groove 10B of outer housing 10 and peripheral groove 12D of inner housing 12.

As is seen in FIG. 3, together with first flow path 17 and second flow path 18, annular protrusion 16 extends circumferentially around impeller 20 in the range covered with given angle θ (for example, θ=250° to 270°), thus preventing jamming (stagnation) and the like of the fuel which flows from intake port II to delivery port 14 through fuel passage 15.

Moreover, fuel passage 15 including first flow path 17 and second flow path 18 surrounds impeller 20 and defines a cross section S, as is seen in FIG. 4. More specifically, cross section S is an addition of an outer peripheral flow path cross section SA (shaded rightward upward in FIG. 4), a first side flow path cross section SB1 (shaded leftward upward in FIG. 4) and a second side flow path cross section SB2 (shaded leftward upward in FIG. 4), as given by the following expression 1:

$$S = SA + SB1 + SB2 \quad \text{<Expression 1>}$$

Moreover, fuel passage 15 defines a typical dimension Rm given by the following expression 2:

$$Rm = S/(2 \cdot H + T) \quad \text{<Expression 2>}$$

where H is a height of a vane 20A of impeller 20, and T is a thickness of vane 20A of impeller 20.

A profile of the cross section defined by first flow path 17 and second flow path 18 has a profile length Lp along a wall of first flow path 17 and a wall of second flow path 18. In other words, profile length Lp of fuel passage 15 is determined by substantially an arc connecting a first point A, a second point B, a third point C, a fourth point D and a fifth point E, as is seen in FIG. 4.

Fuel passage 15 is so profiled as to satisfy the following expression 3 concerning profile length Lp relative to typical dimension Rm:

$$Lp/Rm = 11 \text{ to } 16 \text{ (an after-described first range } \alpha\text{)} \quad \text{<Expression 3>}$$

Hereinafter Lp/Rm is referred to as "dimension ratio."

Preferably, fuel passage 15 is so profiled as to satisfy the following expression 4 concerning profile length Lp relative to typical dimension Rm:

$$Lp/Rm = 12 \text{ to } 15 \text{ (an after-described second range } \beta\text{)} \quad \text{<Expression 4>}$$

There is provided a seal bulkhead 19 disposed on barrel portion 12A's side of inner housing 12, as is seen in FIG. 3. Seal bulkhead 19 is a protrusion in a shape of an arc protruding from barrel portion 12A of inner housing 12 to a position in the vicinity of the outer periphery of impeller 20, as is seen in FIG. 3. Moreover, between intake port 11 and delivery port 14, seal bulkhead 19 seals the outer periphery of impeller 20, thus helping the fuel from intake port 11 to flow along fuel passage 15.

There is provided impeller 20 rotatably received in receptacle dent portion 13 of pump housing 9. Impeller 20 is made, for example, of a reinforced plastic material, and shaped substantially into a disk. Impeller 20 has the outer periphery formed with a plurality of arrayed vanes 20A. In this case, each of vanes 20A of impeller 20 defines height H and thickness T, as is seen in FIG. 4.

The outer periphery of impeller 20 is formed with arc dent portions 20B each of which is disposed between two vanes 20A. Hereinabove, arc dent portions 20B are disposed in upper and lower parts of the outer periphery of impeller 20, as is seen in FIG. 4. In terms of curvature, each of arc dent portions 20B is substantially equivalent to first flow path 17 and second flow path 18 in pump housing 9, as is seen in FIG. 4. Moreover, substantially in the center of impeller 20 there is defined a mating hole 20C for rotational shaft 6 while a through hole 20D is defined around mating hole 20C, as is seen in FIG. 3. In FIG. 3, through hole 20D is, for example, three in number.

In receptacle dent portion 13, impeller 20 has an upper face and a lower face which are floatably sealed between an upper face of outer housing 10 and a lower face of cover member 12B of inner housing 12, as is seen in FIG. 4. In this state, electric motor 7 allows impeller 20 to rotate integrally with rotational shaft 6. Each of through holes 20D of impeller 20 can contribute to uniformity in fuel pressure between dent portion 10A of outer housing 10 and stepped hole 12E's side of inner housing 12.

There is provided a thrust bearing 21 at the bottom of dent portion 10A of outer housing 10, as is seen in FIG. 2. At the bottom of dent portion 10A, thrust bearing 21 bears a thrust load applied to rotational shaft 6, thus rendering rotational shaft 6 rotatable.

Having the construction described above, the turbine fuel pump according to the first embodiment of the present invention effects the following operation.

Supplying electricity from outside via connector portion 2B of discharge cover 2 can deliver driving current to rotor 7B of electric motor 7, thus allowing rotor 7B to rotate integrally with rotational shaft 6, and moreover rotating impeller 20 in pump housing 9. Rotating impeller 20 can allow the fuel in the fuel tank (not shown) to be absorbed into fuel passage 15 from intake port 11. Then, each of vanes 20A of impeller 20 may force feed the fuel along fuel passage 15, thus delivering the fuel into casing 1 from delivery port 14.

The fuel thus delivered into casing 1 then communicates to discharge cover 2 via passage portion 8 of electric motor 7. Then, the fuel opens check valve 3 in discharge port 2A. Then, the fuel is discharged from discharge port 2A via the outer fuel pipe (not shown) to the injection valve (not shown) on the engine (not shown) side, at discharge pressure of 200 kPa to 500 kPa (kilo Pascal) and flow rate of 30 L/h to 200 L/h (liter per hour).

Hereinabove, fuel passage 15 in pump housing 9 is split into two by annular protrusion 16, namely, first flow path 17 and second flow path 18, thus preventing jamming (stagnation) and the like of the fuel which flows from intake port 11 to delivery port 14 through fuel passage 15. With this, fuel can flow smoothly in first flow path 17 and second flow path 18, thus improving fuel discharge efficiency and the like.

Hereinafter described is the method of forming inner housing 12.

As is seen in FIG. 2, inner housing 12 has the following construction:

Annular protrusion 16 protrudes radially inward from barrel portion 12A of outer housing 12. Inner side of annular protrusion 16 is formed with first flow path 17 (upper in FIG. 2).

Due to the above construction of inner housing 12, forming inner housing 12 in the casting method including the aluminum die cast and the like may be hindered by annular protrusion 16. More specifically, drafting mold dies (not shown) upward and downward cannot be achieved since drafting the mold dies (not shown) from the part corresponding to first flow path 17 may be hindered due to formation of annular protrusion 16.

On the other hand, hereinafter described is the method of forming outer housing 10.

As is seen in FIG. 2, outer housing 10 is formed with dent portion 10A, arc groove 10B and intake port 11. In forming outer housing 10 in the casting method including the aluminum die cast and the like, drafting mold dies (not shown) upward and downward is easy.

Japanese Patent Unexamined Publication No. showa 59 (1984)-141795 (=JP59141795) discloses a pump housing including three members, more specifically, an outer housing (referred to as "part 17" in its English Abstract), an inner housing (referred to as "part 18" in its English Abstract) and an annular spacer ring (referred to as "ring-shaped spacer 91" in its English Abstract). An annular protrusion (referred to as "protruded part 91a" in its English Abstract) formed on an inner periphery of the spacer ring can allow the three members to be formed in a method including aluminum die cast and the like.

Including the above three members, the pump housing according to the Japanese Patent Unexamined Publication No. showa 59 (1984)-141795 (=JP59141795) may take time and labor forces in assembling operation. In addition, each of the three members may have dimensional tolerance, dimensional error, and the like. Therefore, assembling the three members may cause variation in radial clearance and axial clearance between an impeller (referred to as "impeller 32" in its English Abstract) and each of the three members (17, 18, 91).

According to the first embodiment of the present invention, formation and machinability of inner housing 12 is split into the following two sequential steps:
1. First step: Aluminum die cast and the like.
2. Second step: Machining first flow path 17 by milling and the like.

After the first step and the second step described above, pump housing 9 can be constituted of two members, namely, outer housing 10 and inner housing 12, with barrel portion 12A of inner housing 12 formed with annular protrusion 16 protruding radially inward and firth flow path 17 (upper in FIG. 2) formed on inner side of annular protrusion 16.

Hereinafter described is with respect to fuel passage 15.

Figure 5:
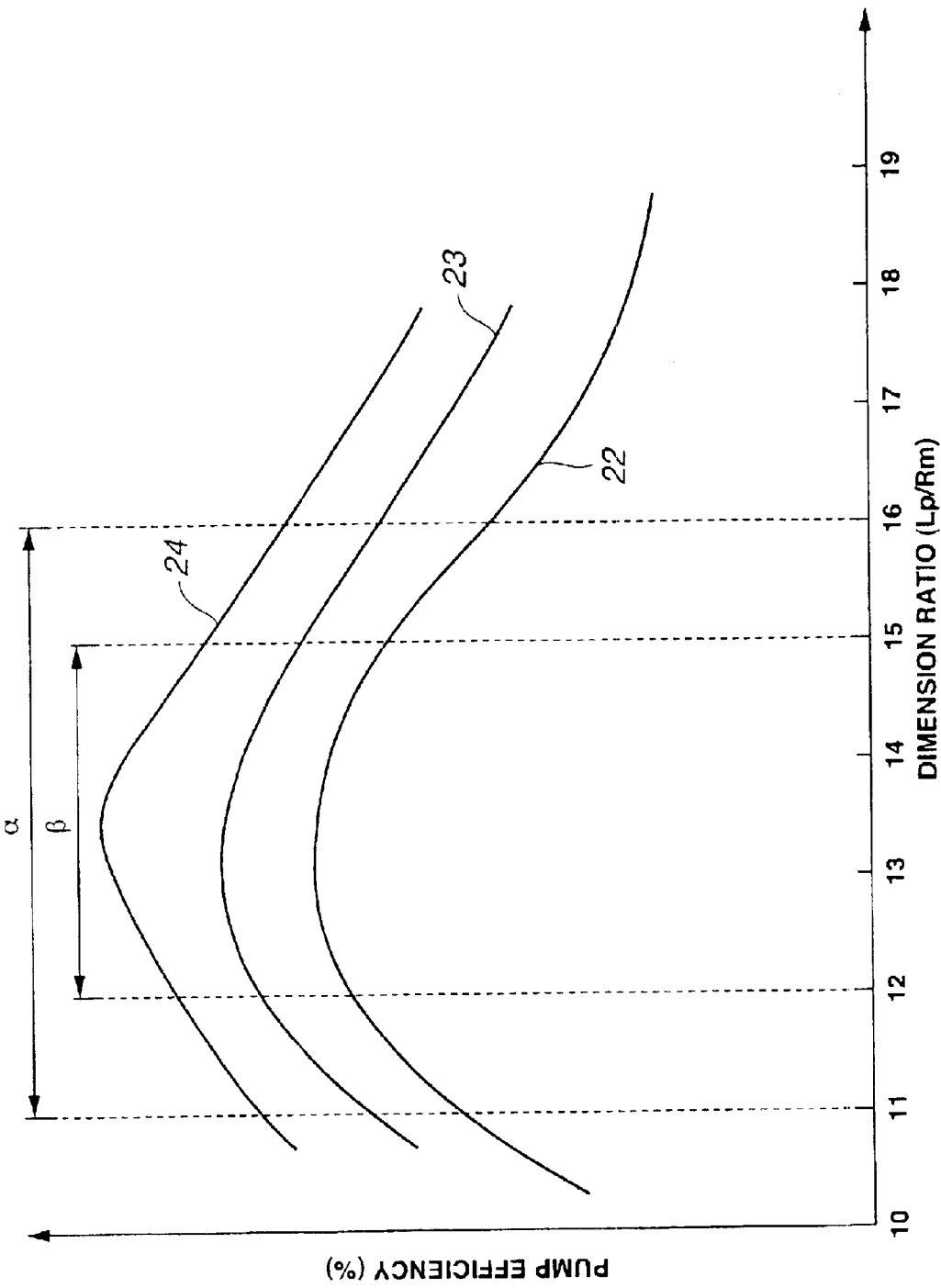
FIG. 5 shows a graph featuring characteristics of the fuel passage 15, namely, a dimension ratio Lp/Rm relative to a pump efficiency η (%).

The profile of fuel passage 15 by satisfying the expression 2 {giving typical dimension Rm=S/(2·H+T)} and the expression 3 (giving dimension ratio Lp/Rm=11 to 16), and preferably the expression 4 (giving dimension ratio Lp/Rm= 12 to 15), can feature a first characteristic curve 22, a second characteristic curve 23 and a third characteristic curve 24 showing an improved pump efficiency η, as is seen in FIG. 5.

Hereinabove, FIG. 5 shows pump efficiency η with the discharge pressure of 300 kPa and discharge flow rate of 80 L/h. First characteristic curve 22 is obtained with cross section S (of first flow path 17 plus second flow path 18), for example, approximately equal to 4.7 mm². Second characteristic curve 23 is obtained with cross section S (of first flow path 17 plus second flow path 18), for example, approximately equal to 5.3 mm². Third characteristic curve 24 is obtained with cross section S (of first flow path 17 plus second flow path 18), for example, approximately equal to 5.9 mm².

In FIG. 5, each of first characteristic curve 22, second characteristic curve 23 and third characteristic curve 3 has dimension ratio Lp/Rm in first range α from 11 to 16, and preferably in second range β from 12 to 15, thus improving pump efficiency η.

In sum, according to the first embodiment of the present invention, designing dimension ratio Lp/Rm (fuel passage 15: profile length Lp relative to typical dimension Rm) meeting the expression 3 (first range α from 11 to 16) and preferably the expression 4 (second range β from 12 to 15) can assuredly improve pump efficiency η of the turbine fuel pump.

Moreover, pump housing 9 including the two members, namely, outer housing and inner housing 12 can reduce the number of parts, compared with the pump housing including three members according to the Japanese Patent Unexamined Publication No. showa 59 (1984)-141795 (=JP59141795). Thereby, pump housing 9 can assuredly improve operationability in assembly and smoothen the fuel flow in pump housing 9, thus contributing to improvement in pump efficiency η.

Moreover, pump housing 9 including two members (instead of three or more), namely, outer housing 10 and inner housing 12 can reduce variation in radial clearance and axial clearance between impeller 20 and a wall of fuel passage 15, thus facilitating formation and machinability of each member.

Figure 6:
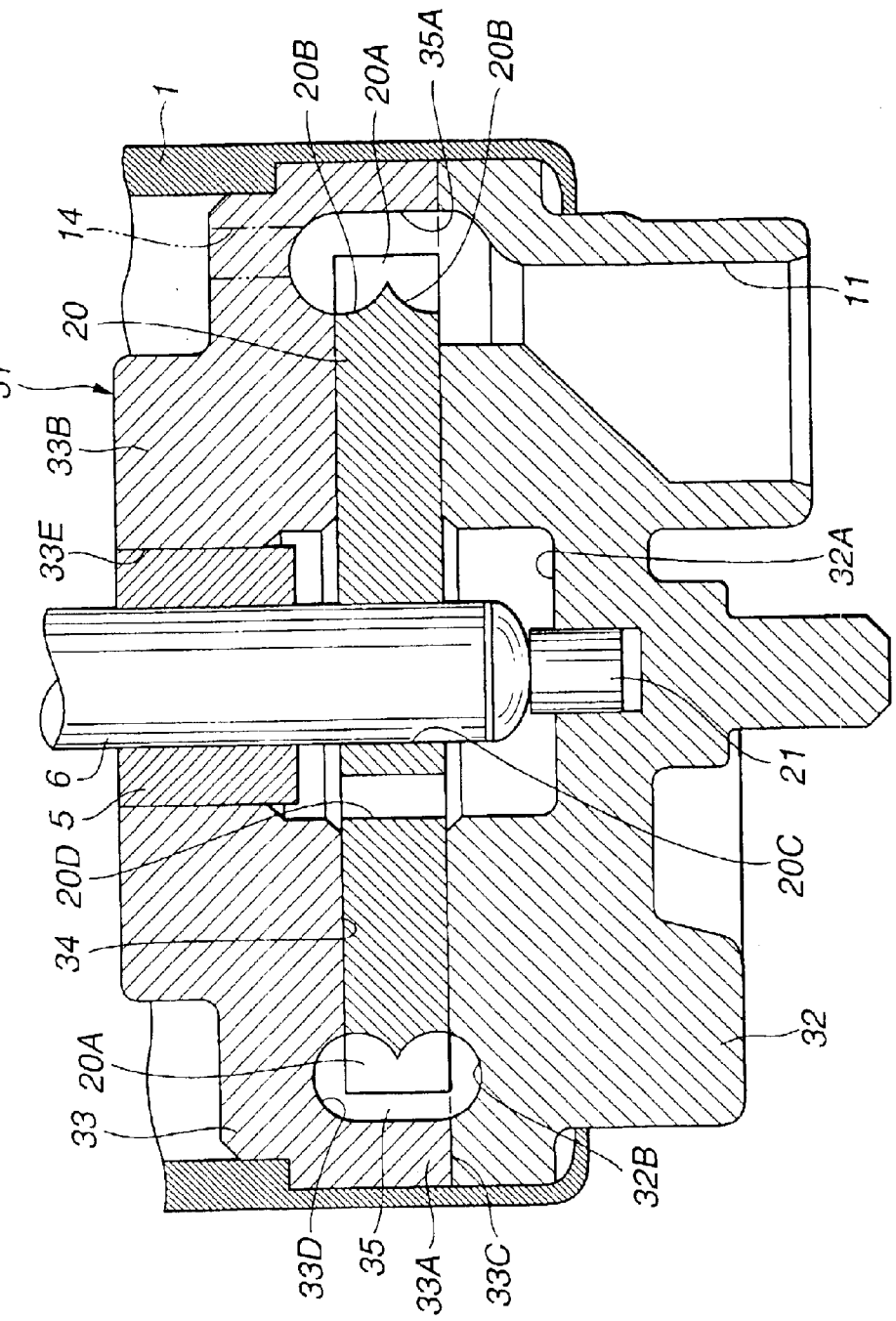
FIG. 6 is similar to FIG. 2, but shows a cross section of an enlarged essential part including a pump housing 31 and the like, according to a second embodiment of the present invention.
Figure 7:
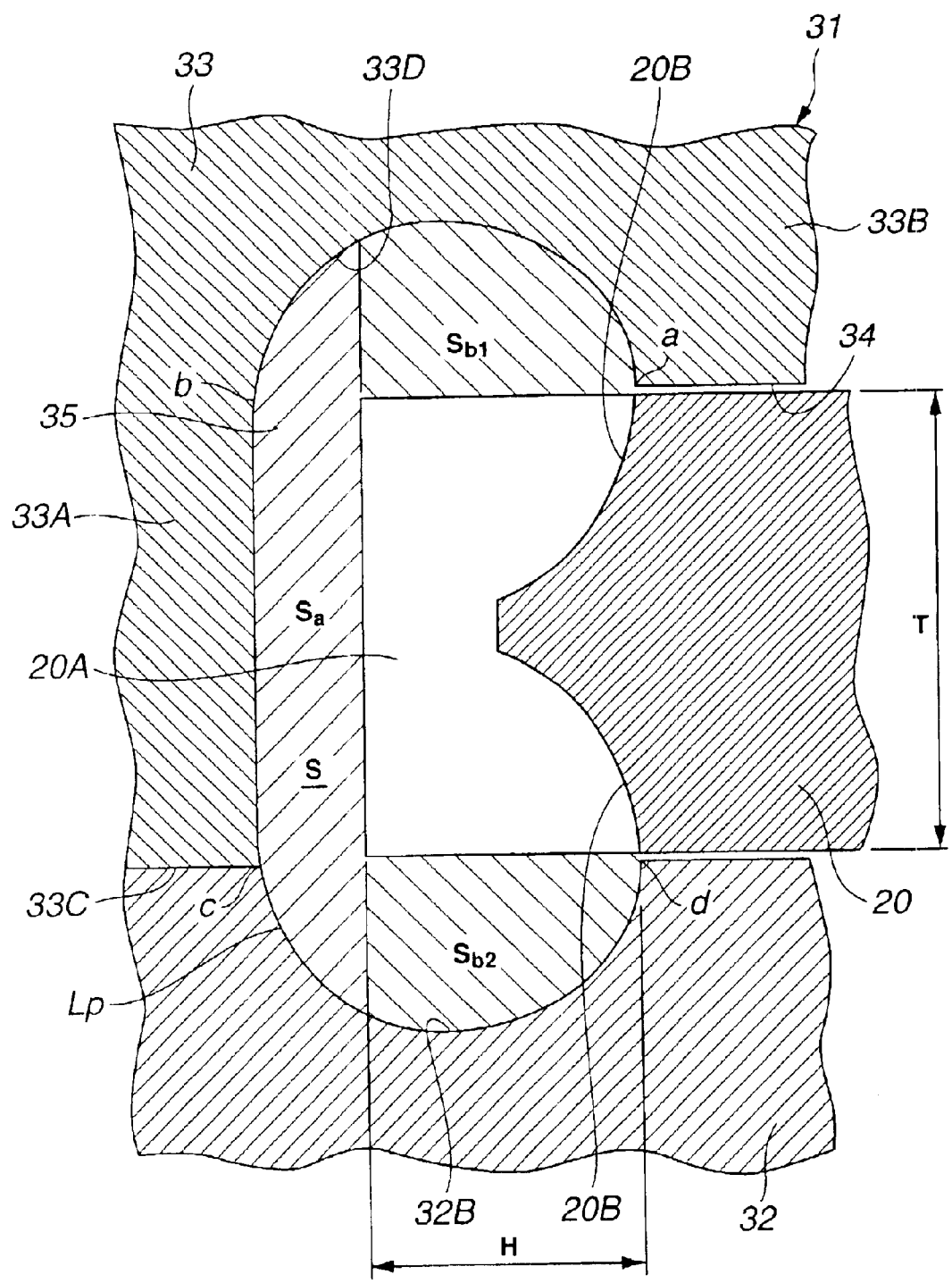
FIG. 7 is similar to FIG. 4, but shows an enlarged essential part including a fuel passage 35, according to the second embodiment.

As is seen in FIG. 6 and FIG. 7, there is provided the turbine fuel pump, according to a second embodiment of the present invention.

In FIG. 6 and FIG. 7, parts and sections substantially the same as those according to the first embodiment are denoted by the same numerals, and repeated descriptions are omitted.

According to the second embodiment, annular protrusion 16 splitting fuel passage 15 into first flow path 17 and second flow path 18 according to the first embodiment is not used, thus forming a single flow path for the fuel.

There is provided a pump housing 31 substantially similar in construction to pump housing 9 according to the first embodiment. Pump housing 31 is constituted of two members, namely, an after-described outer housing 32 and an after-described inner housing 33 physically joining with each other. Impeller 20 is rotatably housed in pump housing 31.

There is provided outer housing 32 constituting a housing member of pump housing 31. Outer housing 32 is substantially similar in construction to outer housing 10 according to the first embodiment. More specifically, outer housing 32 has a dent portion 32A and an arc groove 32B. Moreover, outer housing 32 is formed with intake port 11 for taking in the fuel.

There is provided inner housing 33 constituting the housing member of pump housing 31 in combination with outer housing 32. Inner housing 33 is substantially similar in construction to inner housing 12 according to the first embodiment. Inner housing 33 is formed with a barrel portion 33A and a cover member 33B. Inner housing 33 is substantially a flat covering barrel. More specifically, barrel portion 33A is a peripheral wall of inner housing 33, while cover member 33B covers over barrel portion 33A.

On an inner side of barrel portion 33A, there is defined a receptacle dent portion 34 shaped substantially into a circle. Impeller 20 is rotatably received in receptacle dent potion 34. There is also defined a joining face 33C for physically joining outer housing 32 with inner housing 33. Receptacle dent portion 34 opens to joining face 33C's side.

Unlike inner housing 12 according to the first embodiment, inner housing 33 according to the second embodiment is formed with a peripheral groove 33D extending in such a manner as to form a series with arc groove 32B of outer housing 32. In other words, peripheral groove 33D starts from an inner periphery of barrel portion 33A to cover member 33B substantially in a form of an English alphabet "J" symmetrically reversed. In combination with arc groove 32B, peripheral groove 33D determines a profile of an after-described fuel passage 35.

Substantially in the center of cover member 33B of inner housing 33, there is formed a stepped hole 33E, as is seen in FIG. 6. Like second bush 5 according to the first embodiment, second bush 5 according to the second embodiment can securely mate in stepped hole 33E. Cover member 33B has an outer periphery formed with delivery port 14 extending upward and downward, as is depicted by two-chain lines in FIG. 6.

There is provided a fuel passage 35 in pump housing 31. Fuel passage 35 is positioned outside receptacle dent portion 34 and shaped substantially into an annularity. Fuel passage 35 according to the second embodiment is substantially similar in construction to fuel passage 15 according to the first embodiment. Around the initial terminal of fuel passage 35, there is defined an intake passage portion 35A which is formed by partly cutting out barrel portion 33A and cover member 33B of inner housing 12.

The profile of fuel passage 35 is determined by arc groove 32B of outer housing 32 and peripheral groove 33D of inner housing 33. Unlike fuel passage 15 according to the first embodiment, fuel passage 35 according to the second embodiment is a single flow path, instead of having two split flow paths (upper and lower).

Moreover, fuel passage 35 surrounds impeller 20 and defines a cross section S, as is seen in FIG. 7. More specifically, cross section S is an addition of an outer peripheral flow path cross section Sa (shaded rightward upward in FIG. 7), a first side flow path cross section Sb1 (shaded leftward upward in FIG. 7) and a second side flow path cross section Sb2 (shaded leftward upward in FIG. 7), as given by the following expression 5:

$$S = Sa + Sb1 + Sb2 \qquad \text{<Expression 5>}$$

Like fuel passage 15 according to the first embodiment, fuel passage 35 according to the second embodiment defines typical dimension Rm which can be given by the expression 2.

On the other hand, profile length Lp of fuel passage 35 is determined by arcs and substantially a straight line connecting a first point a, a second point b, a third point c, and a fourth point d, as is seen in FIG. 7.

Moreover, like fuel passage 15 according to the first embodiment, fuel passage 35 according to the second embodiment is so profiled as to satisfy the expression 3 concerning dimension ratio Lp/Rm (profile length Lp relative to typical dimension Rm), and preferably the expression 4.

The turbine fuel pump having the above construction according to the second embodiment can bring about substantially the similar effect to that brought about by the turbine fuel pump according to the first embodiment.

With this, designing dimension ratio Lp/Rm (fuel passage 35: profile length Lp relative to typical dimension Rm) in first range α from 11 to 16 and preferably second range β from 12 to 15 as depicted by first characteristic curve 22, second characteristic curve 23 and third characteristic curve 24 can assuredly improve pump efficiency η of turbine fuel pump.

Although the present invention has been described above by reference to certain embodiments, the present invention is not limited to the embodiments described above. Modifications and variations of the embodiments described above will occur to those skilled in the art, in light of the above teachings.

More specifically, according to the first embodiment, the inner side of inner housing 12 is subjected to the milling for forming first flow path 17 (upper in FIG. 2). The present invention is, however, not limited to this. Other method can be applied to machine fist flow path 17 forming a concave groove which has a cross section shaped substantially into an arc, or into an English alphabet "U."

This application is based on a prior Japanese Patent Application No. P2002-167506 (filed on Jun. 7, 2002 in Japan). The entire contents of the Japanese Patent Application No. P2002-167506 from which priority is claimed is incorporated herein by reference, in order to take some protection against mis-translation or omitted portions.

The scope of the present invention is defined with reference to the following claims.

What is claimed is:

1. A turbine fuel pump, comprising:
   i) a casing for casing therein an electric motor;
   ii) a pump housing disposed at the casing, the pump housing being formed with an intake port and a delivery port for respectively taking in and delivering fuel, the pump housing including a fuel passage between the intake port and the delivery port, the fuel passage including a flow path defining a cross section S; and
   iii) an impeller rotatably disposed in the pump housing, the impeller having an outer periphery formed with a vane which force feeds the fuel in the fuel passage of the pump housing when the impeller is rotated with the electric motor, the impeller being surrounded by the flow path, the vane of the impeller defining a height H and a thickness T;
   wherein the fuel passage defines a following typical dimension Rm, with respect to the cross section S of the flow path relative to the height H of the vane and the thickness T of the vane:

$$Rm = S/(2H+T), \text{ and}$$

wherein a wall of the flow path defining the cross section S is profiled by a profile length Lp, the profile length Lp divided by the typical dimension Rm making a dimension ratio Lp/Rm in a first range from 11 to 16.

2. The turbine fuel pump as claimed in claim 1, wherein the profile length Lp divided by the typical dimension Rm makes the dimension ratio Lp/Rm in a second range from 12 to 15.

3. The turbine fuel pump as claimed in claim 1, wherein the casing is shaped substantially into a barrel, the fuel passage included in the pump housing is shaped substantially into an annularity, and the vane which force feeds the fuel in the fuel passage of the pump housing comprises a plurality of arrayed vanes.

4. The turbine fuel pump as claimed in claim 1 wherein the turbine fuel pump further comprises a rotational shaft including:

i) a first end inserted into a discharge cover which is disposed opposite to the pump housing at the casing, and ii) a second end protruding into the pump housing, and the second end of the rotational shaft is formed with a chamfer portion which engages with the impeller in a state of stopping a rotation of the impeller.

5. The turbine fuel pump as claimed in claim 4 wherein the pump housing disposed at the casing includes an outer housing and an inner housing in such a manner that the outer housing physically joins with the inner housing.

6. The turbine fuel pump as claimed in claim 5 wherein the outer housing is engaged with a lower end of the casing, thus blocking the casing from outside, the outer housing is formed with the intake port for taking in the fuel, substantially in a center of the outer housing, a dent portion is formed which is shaped substantially into a circle, the outer housing is formed with an arc groove which extends circumferentially around an axial line outside the impeller in a range covered with a given angle and has a cross section shaped substantially into a semicircle, and in combination with a peripheral groove of the inner housing, the arc groove forms a second flow path of the fuel passage, the second flow path being disposed on the outer housing's side of the pump housing.

7. The turbine fuel pump as claimed in claim 6 wherein the inner housing is formed with a barrel portion and a cover member, such that the inner housing is substantially a flat covering barrel, the barrel portion is a peripheral wall of the inner housing, while the cover member covers over the barrel portion, a receptacle dent portion shaped substantially into a circle is defined on an inner side of the barrel portion, the impeller being received in the receptacle dent potion, the receptacle dent portion opens to a joining face for physically joining the outer housing with the inner housing, the barrel portion of the inner housing is formed with the peripheral groove shaped substantially into an arc, the peripheral groove is disposed below an annular protrusion, in combination with the arc groove of the outer housing, the peripheral groove forms the second flow path, a stepped hole is formed substantially in a center of the cover member of the inner housing, and the cover member has an outer periphery formed with the delivery port extending upward and downward.

8. The turbine fuel pump as claimed in claim 7 wherein the fuel passage is positioned outside the receptacle dent portion, the fuel passage extends circumferentially around an axial center, and the annular protrusion splits the fuel passage into two including a first flow path and the second flow path of the fuel passage, the first flow path being disposed on the inner housing's side of the pump housing.

9. The turbine fuel pump as claimed in claim 8 wherein the fuel passage has an initial terminal communicating to the intake port and an end terminal communicating to the delivery port, around the initial terminal of the fuel passage, an intake passage portion is defined which is formed by partly cutting out the barrel portion and the cover member of the inner housing, and the fuel taken in from the intake port is led into the fuel passage through the intake passage portion.

10. The turbine fuel pump as claimed in claim 9 wherein the annular protrusion is disposed on the barrel portion of the inner housing, substantially in a form of a mountain, the annular protrusion protrudes radially inward toward the outer periphery of the impeller, thus axially splitting the fuel passage into the first flow path and the second flow path.

11. The turbine fuel pump as claimed in claim 10 wherein the first flow path forms a concave groove which has a cross section shaped substantially into an arc, the second flow path is formed with the arc groove of the outer housing and the peripheral groove of the inner housing, and together with the first flow path and the second flow path, the annular protrusion extends circumferentially around the impeller in the range covered with the given angle, thus preventing a jamming or a stagnation of the fuel which flows from the intake port to the delivery port through the fuel passage.

12. The turbine fuel pump as claimed in claim 11 wherein a seal bulkhead is disposed on the barrel portion's side of the inner housing, the seal bulkhead is a protrusion in a shape of an arc protruding from the barrel portion of the inner housing to a position in a vicinity of the outer periphery of the impeller, and between the intake port and the delivery port, the seal bulkhead seals the outer periphery of the impeller, thus helping the fuel from the intake port to flow along the fuel passage.

13. The turbine fuel pump as claimed in claim 12 wherein the outer periphery of the impeller is formed with arc dent portions each of which is disposed between two of the vanes, the arc dent portions being disposed in upper and lower parts of the outer periphery of the impeller, in terms of a curvature, each of the arc dent portions is substantially equivalent to the first flow path and the second flow path in the pump housing, and substantially in a center of the impeller a mating hole is defined for the rotational shaft, and a through hole is defined around the mating hole.

14. The turbine fuel pump as claimed in claim 13 wherein in the receptacle dent portion, the impeller has an upper face and a lower face which are floatably sealed between an upper face of the outer housing and a lower face of the cover member of the inner housing, a thrust bearing is provided at a bottom of the dent portion of the outer housing, and at the bottom of the dent portion, the thrust bearing bears a thrust load applied to the rotational shaft, thus rendering the rotational shaft rotatable.

15. The turbine fuel pump as claimed in claim 6 wherein the inner housing is formed with the peripheral groove extending in such a manner as to form a series with the arc groove of an outer housing, the peripheral groove and the arc groove being free from a formation of an annular protrusion therebetween, the peripheral groove starts from an inner periphery of a barrel portion to a cover member, in combination with the arc groove, the peripheral groove determines a profile of the fuel passage, and the fuel passage is a single flow path.

16. A pump housing, comprising:

i) a fuel passage formed between an intake port and a delivery port for respectively taking in and delivering fuel, the fuel passage including a flow path defining a cross section S; and ii) an impeller rotatably disposed in the pump housing, the impeller having an outer periphery formed with a vane which force feeds the fuel in the fuel passage of the pump housing when the impeller is rotated with an electric motor, the impeller being surrounded by the flow path, the vane of the impeller defining a height H and a thickness T;

wherein the fuel passage defines a following typical dimension Rm, with respect to the cross section S of the flow path relative to the height H of the vane and the thickness T of the vane:

$$Rm = S/(2H+T), \text{ and}$$

wherein a wall of the flow path defining the cross section S is profiled by a profile length Lp, the profile length Lp divided by the typical dimension Rm making a dimension ratio Lp/Rm in a first range from 11 to 16.

17. The turbine fuel pump as claimed in claim 16, wherein the profile length Lp divided by the typical dimension Rm makes the dimension ratio Lp/Rm in a second range from 12 to 15.

* * * * *